3 Sheets—Sheet 1.
J. & J. H. HENDY.
ORE FEEDER.
No. 10,983. Reissued Feb. 5, 1889.
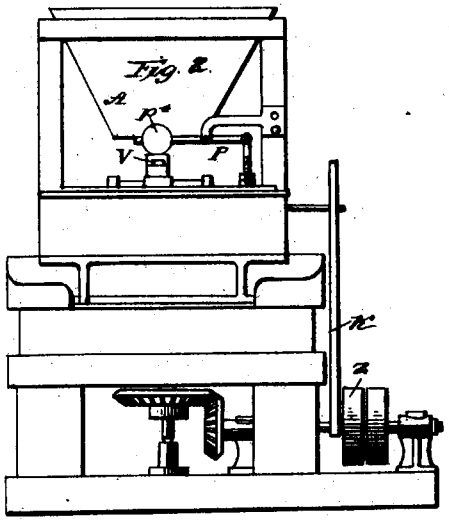
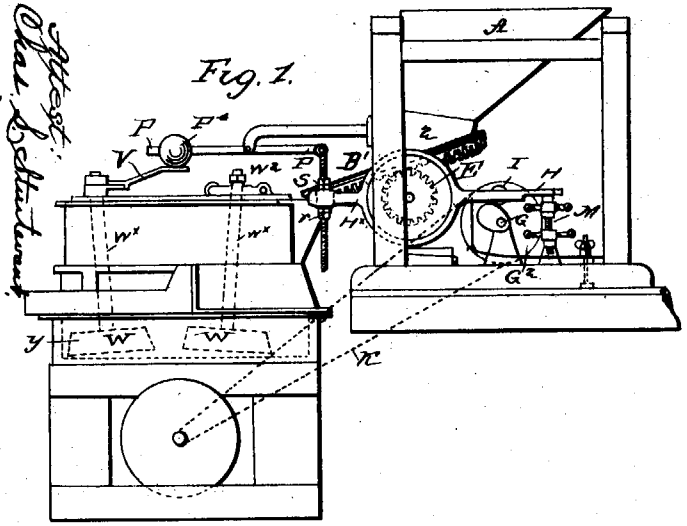
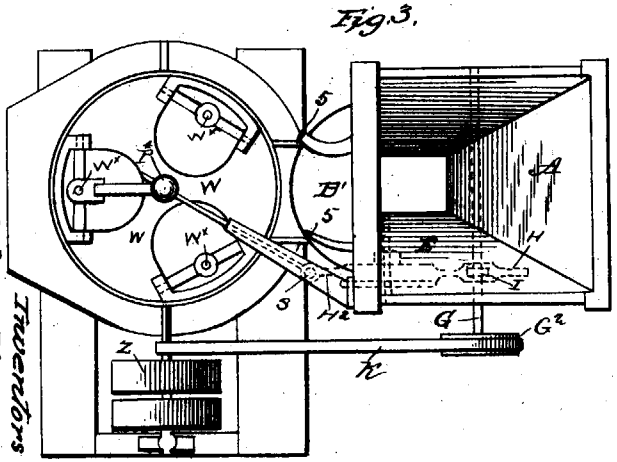
Attest:
Chas. L. Sturtevant.
F. L. Middleton
Inventors
Joshua Hendy
John H. Hendy
by Ellis Spear
Atty.
N. PETERS, Photo-Lithographer, Washington, D. C.

J. & J. H. HENDY.

ORE FEEDER.

No. 10,983. Reissued Feb. 5, 1889.

Attest:
C. S. Stuntevant.
F. L. Middleton

Inventor
Joshua Hendy
John H. Hendy
by Ellis & Spear
Atty.

N. PETERS, Photo-Lithographer, Washington, D. C.

J. & J. H. HENDY.
ORE FEEDER.
No. 10,983. Reissued Feb. 5, 1889.
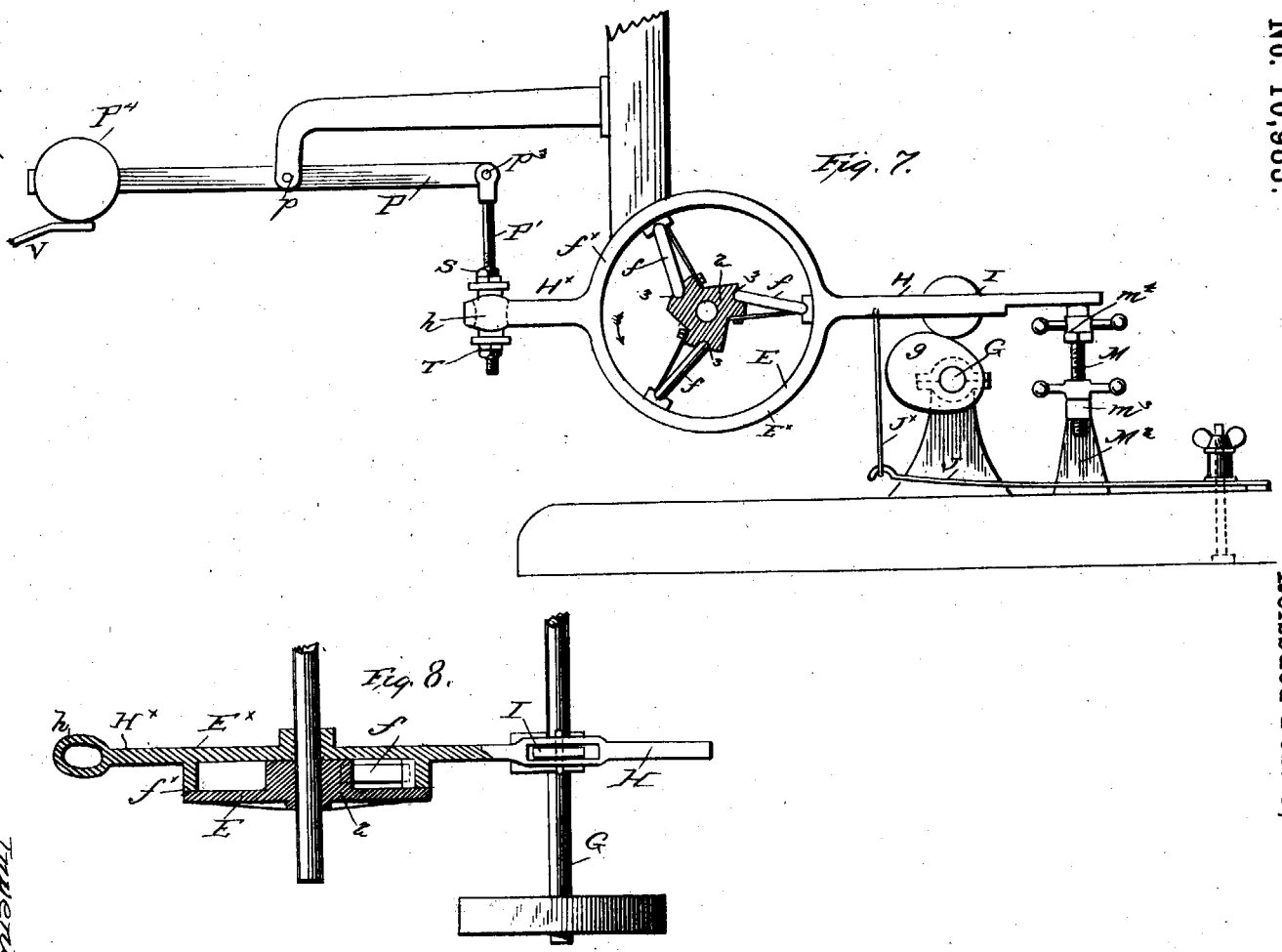
Attest
Walter Donaldson
Chas. L. Stuntevant.
Inventors
Joshua Hendy
John H. Hendy
by Ellis Spear
Atty.
N. PETERS, Photo-Lithographer, Washington, D. C.

UNITED STATES PATENT OFFICE.

JOSHUA HENDY AND JOHN H. HENDY, OF SAN FRANCISCO, CALIFORNIA.

ORE-FEEDER.

SPECIFICATION forming part of Reissued Letters Patent No. 10,983, dated February 5, 1889.

Original No. 365,518, dated June 28, 1887. Application for reissue filed April 18, 1888. Serial No. 271,101.

*To all whom it may concern:*

Be it known that we, JOSHUA HENDY and JOHN H. HENDY, citizens of the United States, residing in the city and county of San Francisco and State of California, have invented certain new and useful Improvements in Ore-Feeders; and we do hereby declare that the following is a full, clear, and exact description of our invention, reference being had to the accompanying drawings.

Our invention relates to improvements in ore-feeders for quartz-mills.

Machines of this class to which our improvements relate have a supply-hopper, a feeding device by which the material is discharged from the hopper at such times and in such quantities as the grinding or reducing mill calls for, and, in connection with the feeding device, certain mechanism operating to control and regulate the feed by or from the mill itself.

The improvements embraced in our invention relate to the construction and combination of parts, hereinafter described and claimed.

These improvements as constructed and applied for operation according to our invention are fully explained in the following description and drawings, the said drawings being referred to by figures and letters.

Figure 4:
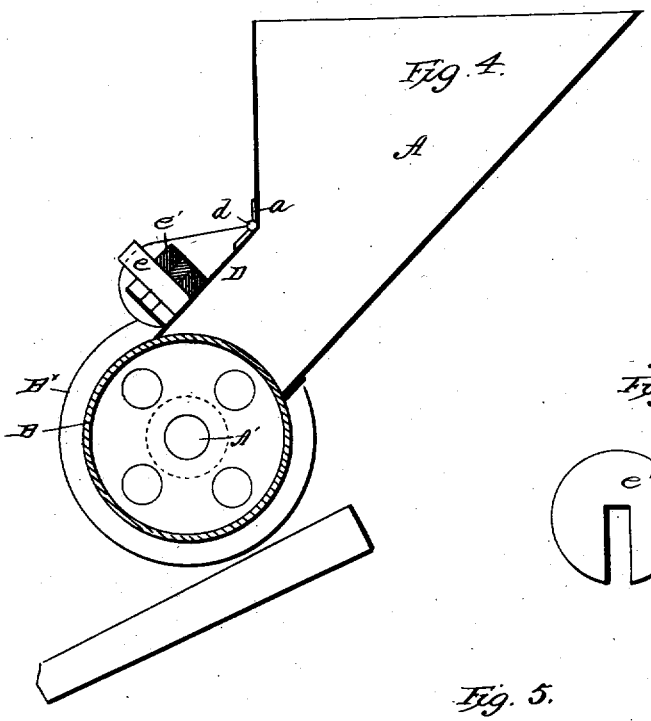
Figure 6:
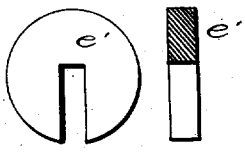
Figure 5:
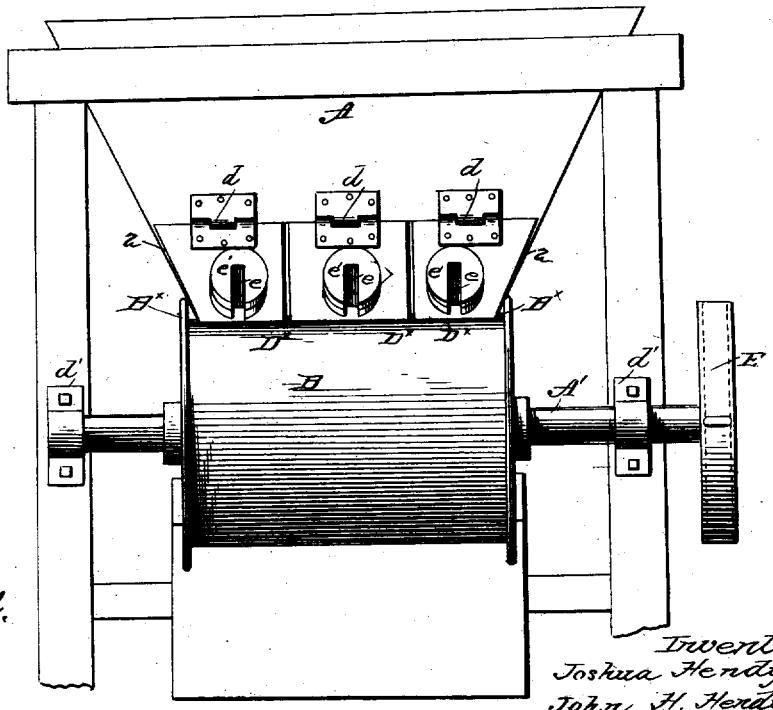

Figure 1 is a side elevation of a rotary grinder with our feeder attached. Fig. 2 is an end view of the same. Fig. 3 is a plan view of the same. Fig. 4 represents an enlarged vertical section of the hopper from front to rear, showing a cylinder-feed. Fig. 5 represents the same part in front elevation. Fig. 6 shows the weights of Figs. 4 and 5 in detail. Fig. 7 is an enlarged view of the feed-operating mechanism with a section of the clutch. Fig. 8 is a top view and partial horizontal section of parts of the same.

In Figs. 1, 2, and 3 is shown the entire mechanism in connection with a form of ore-feeder, (the inclined rotating table under the hopper, as set forth in Letters Patent No. 9,061, reissued by the United States Patent Office on the 3d day of February, 1880, to T. A. Cochrane, as assignor to Joshua Hendy.)

In Fig. 3 the circular rotating table is shown at B′, and the guides to direct the ore and extending over the table are shown at 5 5.

In the form shown in Figs. 4 and 5 the hopper is formed with a straight breast, sloping back, and sides that converge to the front. The back extends forward to a point directly under and in line with the bottom edge, *a*, of the breast or front. The space between this bottom edge and the edge of the sloping back below is the ore-outlet of the hopper.

B is the feeding-cylinder, mounted on the hopper-frame directly against this outlet. Its general function is the same as that of the feed-plate of the preceding figures. It has a smooth cylindrical surface, and it is set closely against the edge of the sloping back and under the edge *a* of the front. In such position the cylinder closes the ore-outlet from the edge of the sloping back to a point half-way or more between it and the uppermost edge of the opening, and projects more or less into the hopper and a distance beyond the breast of the same.

The space between the cylinder and edge *a* is closed by the swinging gate or apron D, attached by hinges *d* to the hopper-front in such a manner that the opening above the cylinder is closed, and the body of ore is held back by the weight or resistance of the gate. It is attached by hinges or other yielding connections, in order that under the pressure and movement of the ore produced by the rotation of the cylinder it may swing outward or yield sufficiently to let the ore pass under its edge. Flat springs could be used instead of hinges to attach the gate to the hopper-front. We construct this gate in separate and independently-moving sections, as shown more particularly at D* D*, Fig. 5. Each section is therefore free to yield and fall back again into proper position without disturbing the others. This construction will be found to possess considerable advantage over a gate in one piece, particularly in cases of ores having irregularity to a considerable degree in the size of lumps and in material where large pieces are present, since, when one section of the gate is raised by the passage under it of a large piece, the other sections are not disturbed. The section of the gate thus raised will immediately fall back into line when a large piece has passed out and the escape of the smaller particles will not be materially increased. A gate or apron in one piece would be raised along the entire edge by a large piece of ore in the matter being moved forward by the feed-cylinder, and would therefore increase for the time the discharge of quantity of matter composed of smaller pieces and fine particles.

The gate-sections are set at an inclination, and each one is held down by weights that are increased or reduced in number to regulate the quantity of material being discharged over the top of the cylinder. For this purpose the gate-sections have pins *e* to hold removable weights *e'*. By preference, these sections are made of suitable length to bring their lower edges upon the cylinder along a line perpendicularly or nearly perpendicularly over the axis. Such lengths of gate-sections will be required where the material is generally fine or consists principally of small particles; but for feeding coarse material the edge of the gate need not be brought down so closely to the cylinder as to actually touch it when there is no material in the hopper.

The spaces at the sides of the inclined gate are closed by carrying outward the sides of the hopper, as seen at 2, Figs. 1 and 5, and these sides are set inside the projecting heads or flanges on the ends of the cylinder. These heads are seen at B* B*, Figs. 4 and 5.

The shaft A' of the cylinder is set in boxes *d' d'*, and on one end thereof, projecting beyond the side of the frame, is fixed the disk E of a friction-grip, such as is shown and described in Patent No. 322,716, granted to Joshua Hendy, July 21, 1885, said disk being keyed fast upon its shaft, and is provided with a hub, 2, having sockets 3, adapted to receive the inner ends of arms *f*, said arms being placed tangential to the shaft and of such a length as to bind against the inside of the rim *f** on the disk E* when moved in one direction, and thus turn said wheel or disk. The disk E* is loose upon the shaft and has an arm, H, that extends backward over and in line with a cam, *g*, on the shaft G. This mechanism gives intermittent or step-by-step movement of greater or less length to the feeding-cylinder, and it is of that character of mechanism which is now employed in many machines, and in some ore-feeders, in place of the well-known pawl-and-ratchet wheel to move the feeding device.

We operate this mechanism by and from the continuous rotation of a shaft, G, on the feeder-frame in the following manner: A friction-roller, I, (see Figs. 1 and 7,) is set in a slot or pocket in the arm H to travel on the edge of the cam, and the two are kept in contact by the flat spring J. The end of this spring is connected with the arm by the stirrup J*. By rotation of the cam the arm H is moved up and down once in each revolution of the shaft G. The effect of this is to turn the cylinder-shaft A' a part of a revolution, and the length of such movement is regulated by a stop mechanism that is controlled by the grinding mechanism of the mill, with which the feeding mechanism is connected in operation.

A hand regulating device can be employed also, in all cases where it may be considered desirable, and such a device is shown at M, Fig. 7.

The screw is held by the stand $M^2$ directly under the end of the arm H, and a hand-wheel or arms on the head furnish means for turning it up and down in the socket $m^3$ to raise or lower it. When set to the desired height to stop the lever-arm H, the screw is locked by the jam-nut $m^4$.

The regulating mechanism (shown more particularly in Figs. 1 and 7) is automatic. It consists of the lever P, having fixed fulcrum at *p* on the frame and extending forward into position to bring its outer end over the center of the ore-mill. The opposite end of the lever is connected to the arm H*, that projects from the rim of the loose disk E*, the connection being made by the rod P', which is attached at $p^3$ by a loose joint and passes through the socket *h* on the end of the arm H*. On this rod are two stops, S T, of which the upper one controls the upward movement of the arm H*, and therefore limits the extent of downward movement of the long arm H on the opposite side of the center. The rod is screw-threaded, and the stops are nuts or threaded collars to give adjustment. By setting up the top nut, S, the long arm H is given longer movement upon the cam, and the length of rotation of the cylinder is increased accordingly. The position of this stop determines the longest feed-movement of the cylinder that can be produced when the lever stands in its normal position, or out of action with the part which connects it to the grinding mechanism of the ore-mill. From this point of greatest feed the movement of the long arm H is decreased in proportion as the outer end of the lever P is raised until, as this end is lifted to its highest point, the arm H will not be acted upon at all by the cam G, and the feed-cylinder will stop. Between these points of greatest movement and no movement the feed-cylinder will be affected by the changes taking place in the position of the lever P, and will be governed in the length of its movements accordingly. Therefore, by connecting the outer end of the lever P with some moving part of the ore-mill that is affected by the variation in the quantity of material under process of reduction between the grinding or reducing surfaces, we cause the inner stop-carrying end of the lever to be depressed as the ore-matter accumulates between the grinding-surfaces and to be raised as such matter is discharged, the result of which being to reduce the feed in the one case and to increase it in the other.

The length of feed-movement of the cylinder is regulated each time by the requirements of the mill, and the quantity of material supplied to the grinding-surfaces is controlled by the mill itself in a manner best calculated to secure rapid and effective reduction and discharge of the matter being treated.

For the purpose of illustrating the manner in which we apply our feed actuating and regulating mechanism for operation with ore-mills of the circular or rotary kind, we show in Figs. 1, 2, and 3 of the drawings the kind of ore-mills in which the grinding-wheels or revolving grinders W are mounted on upright spindles W*, and are also suspended from point $W^2$ above, in order to swing or yield in a direction both toward and away from the surrounding circular track or grinding-surface Y of the pan. As the material accumulates between these grinding-surfaces, the revolving grinders are pressed inward away from the sides of the pan, and as the material becomes reduced in bulk and is pulverized sufficiently it is discharged, and the grinders then swing back again into closer relation to the grinding-surface or sides of the pan.

By fixing to the upper end of the spindle of one of the grinding-disks a bar, V, of suitable length to extend to the center of the pan and take under the end of the lever P, we cause this swinging or yielding movement, as produced by the material itself, to act upon the lever, and through it to change the length of feed-movement of the cylinder, as before described. The bar V is rigidly fixed to the spindle of the grinding-roller, and the end of the lever P is kept down against it by the weight $P^4$.

The actuating-shaft G is connected directly to the driving-shaft Z of the mill, from which it receives continuous rotation. For this purpose the shaft G has a pulley, $G^2$, to take a belt, K, from the mill-shaft.

Having thus fully described our invention, what we claim, and desire to secure by Letters Patent, is—

1. In an ore-feeder, the combination, with the hopper and feeding-cylinder, of the cam-shaft having the cam *g* mounted thereon, a friction-clutch comprising a loose disk having arms H H*, projecting therefrom, the weighted lever P, a connection between said lever and arm H*, a spring attached to the arm H, and an arm connected with said lever, the arm V, and the grinding-wheels of a rotary mill, substantially as set forth.

2. In an ore-feeder, the combination, with the hopper and feeding-cylinder, of the cam-shaft having the cam *g* thereon, a friction-clutch having a loose disk with arms H and H* extending therefrom, a spring connected with one of said arms, the weighted lever P, a rod connecting one end of said lever with the arm H*, the stops S and T on said rod, and an arm attached to the grinding wheels or disks of a rotary mill and operated thereby, substantially as described.

3. In combination with the hopper and its rotary feeder, the cam-shaft having the cam *g* mounted thereon, a friction-clutch comprising a loose disk on the shaft which drives the feeding device, having arms H H*, projecting therefrom, the weighted lever P, a connection between said lever and arm H*, a spring attached to the arm H, the arm V, and the grinding-wheel of a rotary mill, substantially as described.

4. In an ore-feeder, the combination, with the hopper, of a feeding device therefor, an actuating-shaft for said feeder, a clutch carried by said shaft, a continuously-operating shaft, a connection between said shaft and the clutch, a mill, a main driving-shaft therefor, a direct and positive connection between said main driving-shaft and the continuously-operating shaft, an arm, V, connected to the spindle of the grinding-disk, and an operating connection between said arm V and the said clutch, substantially as described.

5. In an ore-feeder, a hopper, a feeding device therefor, a shaft for operating the feeder, a clutch carried by said shaft, means for operating said shaft through the clutch, a mill, grinding-surfaces therefor, an arm, V, connected to the spindle of the grinding-disk, and intermediate operating connections between said arm V and the clutch on the shaft of the feeder, whereby the rotation of the feeder-shaft is automatically controlled by the grinding-surfaces, substantially as described.

6. In an ore-feeder, a hopper, a feeding device therefor, a shaft for operating the feeder, a clutch carried by said shaft, means for operating said shaft through the clutch, a mill, grinding-surfaces therefor, and a controlling connection between the grinding-surfaces and the clutch on the shaft of the feeder, consisting of an arm, V, fixed to the upper end of the spindle of the grinding-disk, a pivoted lever having a weighted end in connection with the arm V, and a connection between the inner end of said lever and the clutch, substantially as described.

7. In an ore-feeder, a hopper, a feeding device therefor, a shaft for operating the feeder, a clutch carried by said shaft, means for operating said shaft through the clutch, a mill, grinding-surfaces therefor, and a controlling connection between the grinding-surfaces and a clutch on the shaft of the feeder, consisting of an arm, V, fixed to the upper end of the spindle of the grinding-disk, a pivoted lever having a weighted end in connection with the arm V, an arm, H′, projecting from the rim of the clutch, a connecting-rod between the lever and the arm, and adjustable stops on the said rod, substantially as described.

In testimony whereof we have signed our names to this specification in the presence of two subscribing witnesses.

JOSHUA HENDY.
JOHN H. HENDY.

Witnesses:
CHAS. V. MANNER,
H. B. GASTON.